United States Patent [19]
Moore

[11] Patent Number: 5,935,251
[45] Date of Patent: Aug. 10, 1999

[54] METHOD AND APPARATUS EXPEDITED LOG-ON TO AN APPLICATION PROGRAM

[75] Inventor: Eric R. Moore, West Boylston, Mass.

[73] Assignee: Hewlett Packard Company, Palo Alto, Calif.

[21] Appl. No.: 08/995,598

[22] Filed: Dec. 22, 1997

[51] Int. Cl.$^6$ ..................................................... G06F 15/00
[52] U.S. Cl. ............................................................ 713/202
[58] Field of Search .......................... 395/188.01, 187.01, 395/186, 200.59; 713/202, 201, 200; 364/479.07; 380/3, 4, 23

[56] References Cited

U.S. PATENT DOCUMENTS

| | | | |
|---|---|---|---|
| 5,444,850 | 8/1995 | Chang | 395/200.1 |
| 5,680,547 | 10/1997 | Chang | 395/200.01 |
| 5,684,950 | 11/1997 | Dare et al. | 395/187.01 |
| 5,768,503 | 9/1995 | Olkin | 395/187.01 |
| 5,768,504 | 6/1995 | Kells et al. | 395/187.01 |

Primary Examiner—Robert W. Beausoliel, Jr.
Assistant Examiner—Stephen C. Elmore

[57] ABSTRACT

The method of the invention controls a computer to automatically enter user registration data, upon occurrence of a dialogue box. The computer includes a database which stores instances of data defining characteristics of windows that enable entry of user data so as to enable further execution of the program. The method initially monitors programs that execute on the computer and signals an occurrence of at least one of a set of events, wherein one of the set of events is the creation of a newly activated window. In response to a signalling of the event, the method determines if the event signalled is an activation of window (i.e. a dialogue box) and if yes, finds the newly activated dialogue box's identifier. The method then accesses descriptive data regarding the newly activated dialogue box and determines if it matches an instance of dialogue box data in the database. If yes, the method accesses user identification data from a secure storage area and, under control of data from the instance of the dialogue box data, enters the user identification data into the newly activated dialogue box to allow further execution of the program.

16 Claims, 4 Drawing Sheets

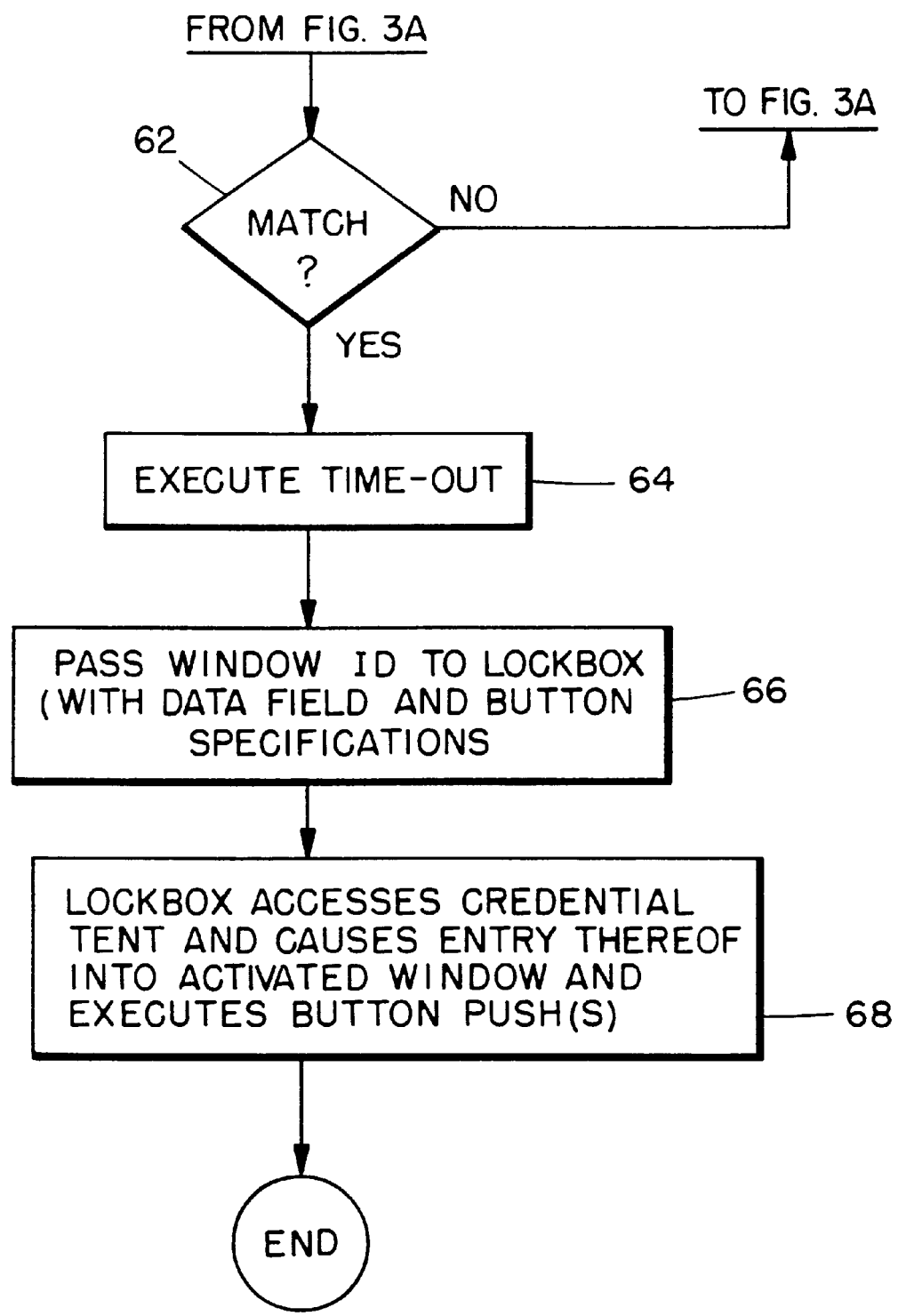

METHOD AND APPARATUS EXPEDITED LOG-ON TO AN APPLICATION PROGRAM

FIELD OF THE INVENTION

This invention relates to a method and apparatus for enabling automatic entry of data into an activated and identified window and, more particularly, to a method and apparatus for enabling a user to automatically log-on to an application program through the vehicle of a dialog box.

BACKGROUND OF THE ART

It is common practice to restrict a user's access to an application program until the user establishes his/her identity to the program. Such an identification is generally accomplished by the user's typing in certain identity information and one or more passwords. This act is generally called "logging-on" and thereafter enables the user to fully utilize the program. The log-on procedure is accomplished by entry of user credential data into a dialog box (i.e., a class of window). Such a log-on procedure is tedious and, at times, annoying, especially when the user has already established a right of access to the data processing system via other security interface arrangements.

To expedite the log-on procedure, the prior art has utilized a number of techniques. One involves the user's activation of a macro program which automatically enters the necessary data/password(s) into a dialog box and, causes actuation of an enter signal to enable access to the application program. The prior art has further enabled such a macro program to be activated by the user's clicking on a sign-on icon to cause execution of the underlying macro. Several "shareware" programs such as Webpass and Password Tracker can automate the feeding of user credentials to a dialog box without requiring user intervention. They detect when a dialog box with a specified title/caption is displayed. While this procedure operates for simple cases, if an application changes the caption, for instance, the automated system does not work correctly.

An expedited sign-on product (i.e., a "single sign-on" or "SSO") entitled "Persauth", utilized by the Union Bank of Switzerland, implements an expedited sign-on wherein a terminal emulation can automatically be given a user ID and a password at the right spot during the log-on sequence. The Persauth product requires customization of all applications that make use of it. While the passwords are stored securely on users' smart cards and are retrieved from there, the actual password transmission is performed exactly as before, which is often in clear text.

The Praesidium SSO, marketed by the Assignee hereof, is based on the BoKS family of SSO software, a product of DynaSoft AB. It provides application connectivity via SSO Application Connectivity Agents (ACA), which are server based application filters which call an SSO server for credential mapping and then insert the correct secondary credentials (user name/password) in the applications data stream. Oracle and Sybase databases are examples of some of the supported applications. Praesidium SSO relies upon a Winsock 2 (a Windows interface) layered service provider on the windows client to transparently intercept/modify the traffic it is sending to a remote application. For each application for which connectivity is provided, it requires writing an ACA specific to that application, which usually involves reverse engineering that application's network protocol. It also requires moving the server application to another port on the server, and installing the ACA on the server as a proxy.

A characteristic of prior art expedited log-on procedures is that explicit identification of the application program is required so as to enable the program's log-on dialog box to be accessed, filled in and the data thereby entered. Such an automated log-on procedure often requires customization of the application program to accept the automated input. There is thus a clear need for an automated log-on procedure which will enable a user's access to an application program, without involvement of the user. Further, such log-on procedure should preferably be invisible to the user and be able to interface with a variety of application programs, without requiring modifications to the application programs. Also, in view of the wide usage of the Windows Operating System (Windows is a registered trademark of the Microsoft Corporation, Redmond, Wash.), such an expedited sign-on procedure should be usable with Windows-based application programs.

The Windows Operating System includes various "hooks" which enable calls to be made to call back functions when specified events occur. For example, a WH_GETMESSAGE hook traps every call to "::GETMESSAGE", whereas a WH_CBT (computer based training) hook traps only certain events, like window creation, destruction and/or activation, among others. Such a hook can be either thread-specific or system-wide. Such a hook enables a dynamic-link library (DLL) to automatically be inserted into an executing application program. A DLL file is one that contains one or more functions that are compiled, linked and stored separately from application processes that use them. Upon a call being made to a DLL, the Windows Operating System maps the DLL data into the process's address space when the process is either starting up or running. The process then executes the functions in the DLL.

Accordingly, a framework exists in the presently available Windows Operating System to enable automatic insertion of a subroutine action upon detection of an event—through the hook procedure.

SUMMARY OF THE INVENTION

The method of the invention controls a computer to automatically enter user registration data, upon activation of a window (i.e., a dialog box). An activation of a dialog box readies it to receive entered data. The computer includes a database which stores instances of data defining characteristics of dialog boxes that enable entry of user data so as to enable further execution of a program. The method initially monitors programs that execute on the computer and signals an occurrence of at least one of a set of events, wherein one of the set of events is the activation of dialog box In response to a signalling of the event, the method determines if the event signalled is a newly activated dialog box and if yes, finds the newly activated dialog box's identifier. The method then accesses descriptive data regarding the newly activated dialog box and determines if it matches an instance of dialog box data in the database. If yes, the method accesses user identification data from a secure storage area and, under control of data from the instance of the dialog box data, enters the user identification data into the newly activated dialog box to allow further execution of the program.

BRIEF DESCRIPTION OF THE DRAWINGS

FIGS. 3A and 3B illustrate a logic flow diagram of the method of the invention.

DETAILED DESCRIPTION OF THE INVENTION

As indicated above, the prior art has recognized a need for an automated log-on procedure when executing an application program. However, the prior art has largely been limited to the user's recognition of a specific dialog box and an initiation of a macro or other automated data entry mechanism to allow insertion of user identification data. In the case of the Windows Operating System, many applications require a log-on, and each has its own particular dialog box and data input requirements. Further, each window is associated with a title (i.e., a unique name) which can be changed by the user. Such title thus cannot be relied upon to automatically identify an occurrence of a particular dialog box.

Accordingly, as will be hereafter understood, the invention incorporates a sophisticated dialog box identification procedure which does not rely upon any single title or other single identifier that is associated with a dialog box. Further, while the invention will be described in the context of entry of user credentials into a dialog box, it is to be understood that the invention is equally applicable to any action which requires identification of an activation of a particular window and a subsequent entry of data thereinto.

Figure 1:
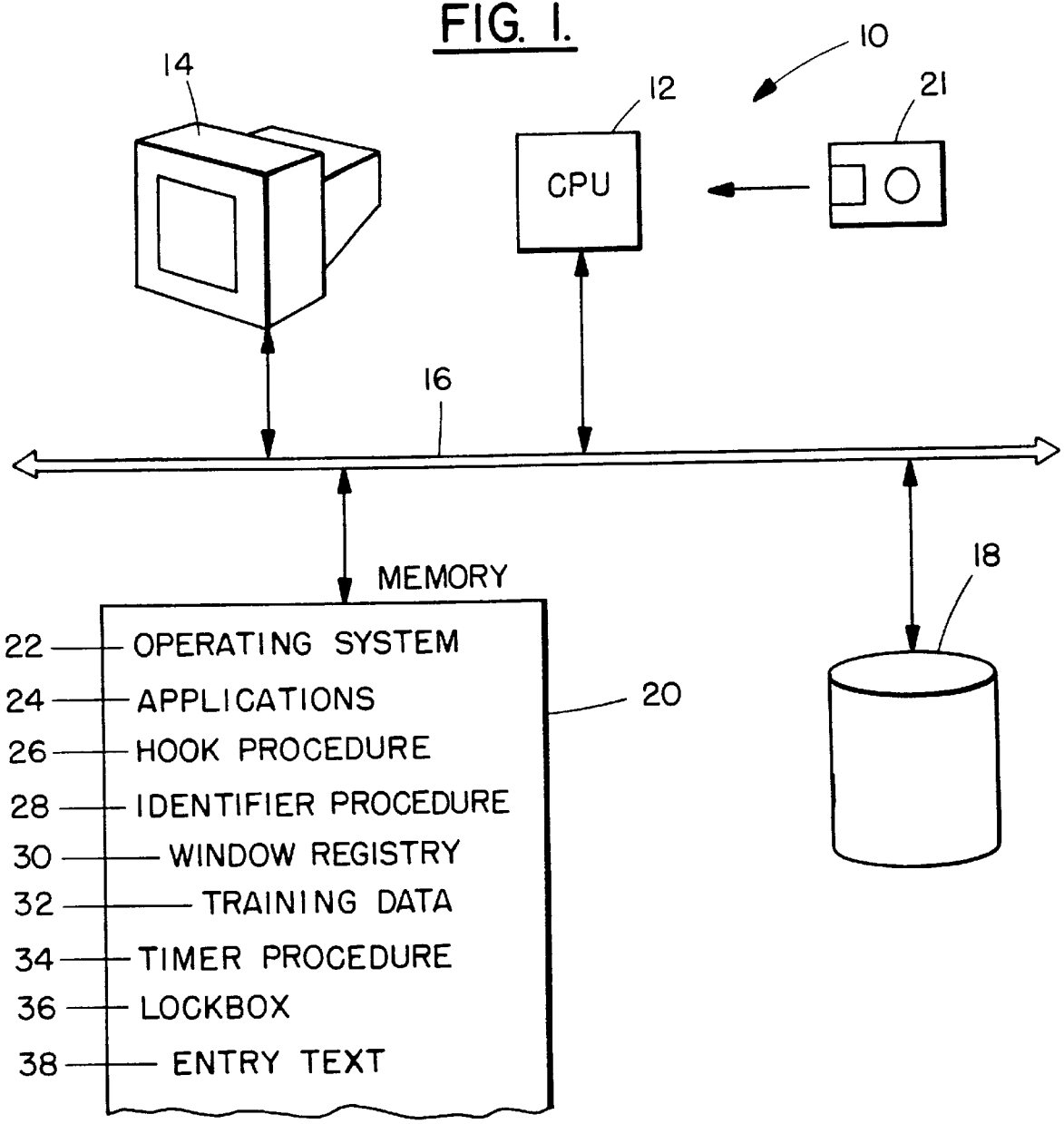
FIG. 1 is a high level block diagram of a computer system that is adapted to perform the method of the invention.

Referring to FIG. 1, a computer 10 includes a central processing unit (CPU) 12 and a display 14, both of which are coupled via a bus system 16. A disk file 18 and a memory 20 are utilized to store various files and databases that are used in the method of the invention. Further, while the procedures that are employed to implement the invention are illustrated as stored in memory 20, such procedures may be stored on disk drive 18 or one or more floppy disks 21. In any instance, CPU 12 is controlled by the stored processes to perform the method of the invention.

Within memory 20, operating system 22 controls the overall operation of CPU 12. It will be hereafter assumed that operating system 22 is the Windows Operating System. Also stored in memory 20 are a plurality of applications 24, at least some of which include code that causes display 14 to present a dialog box which requires a user to enter identification/password data to enable further execution of the application.

Figure 2:
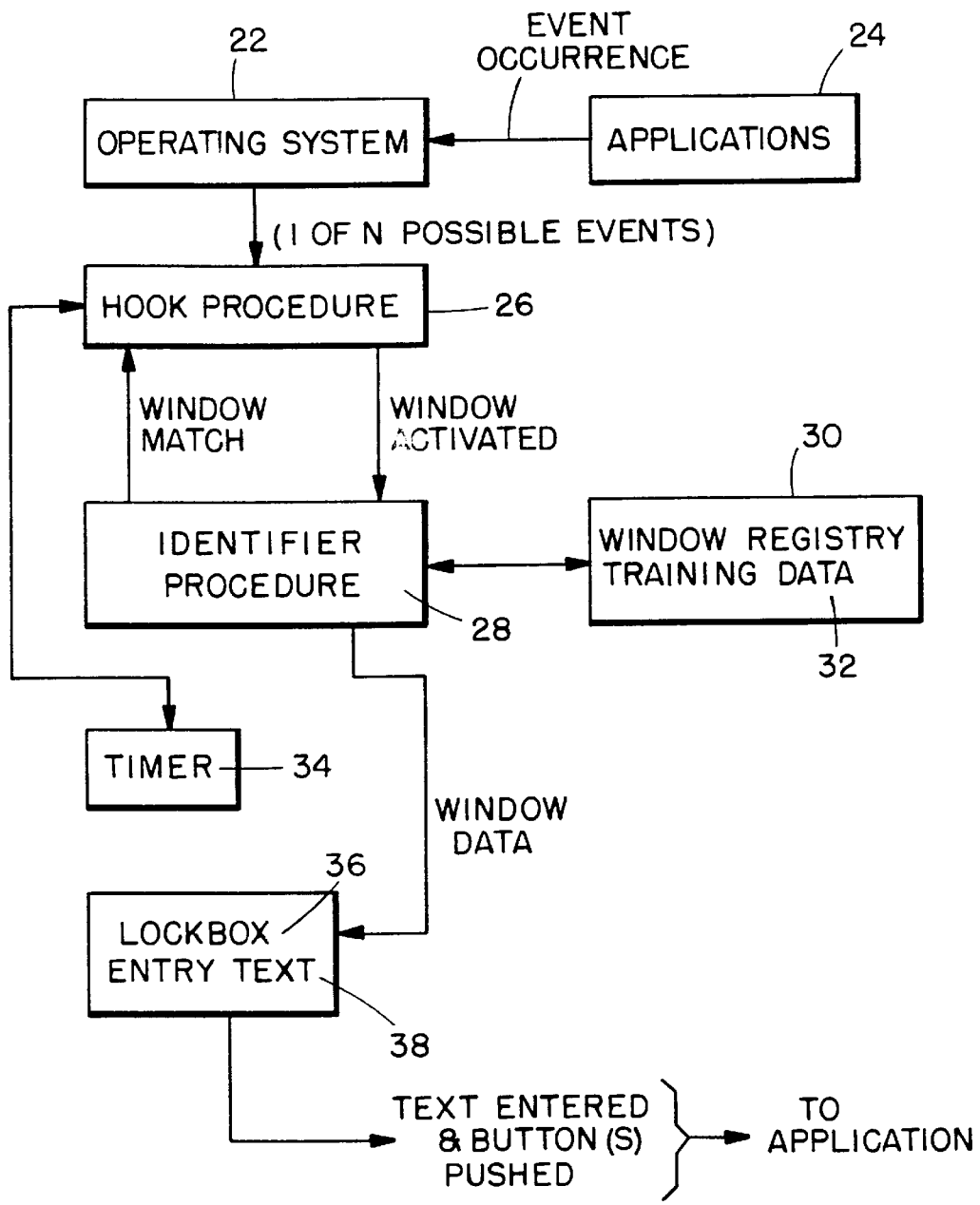
FIG. 2 is a block diagram which illustrates the operating components of a software procedure that performs the invention.

FIG. 2 illustrates the overall relationship of procedures contained within memory 20. The expedited log-on procedure of the invention is implemented by a plurality of procedures contained within memory 20. Those procedures are: a hook procedure 26 which registers a call from operating system 22 upon the occurrence of any of a plurality of events, filters the event notifications and determines if the event that occurred is a newly activated dialog box (activation of a dialog box enable entry of data thereinto for further control an executing application). Upon finding such event, hook procedure 26 calls an identifier procedure 28. Thereafter, identifier procedure 28, in concert with a registry database 30 which includes training data 32, determines whether the newly activated dialog box matches an application dialog box which will accept an expedited log-on entry.

Once identifier procedure 28 determines that the newly activated dialog box is one which will accept an expedited log-on, a timer procedure 34 is called to insert a delay into the process to assure that operating system 22 has sufficient time to properly initialize the newly activated dialog box. Thereafter, identifier procedure 28 passes identification data regarding the newly activated dialog box, including information as where data should be entered thereinto, to a Lockbox 36 which holds entry text 38 for each dialog box. Lockbox 36 then emulates keyboard entry actions and (i) causes entry of the user's identification data into the newly activated dialog box and (ii) performs entry button pushes to assure entry of the data and continuation of execution of the application program.

Figure 3A:
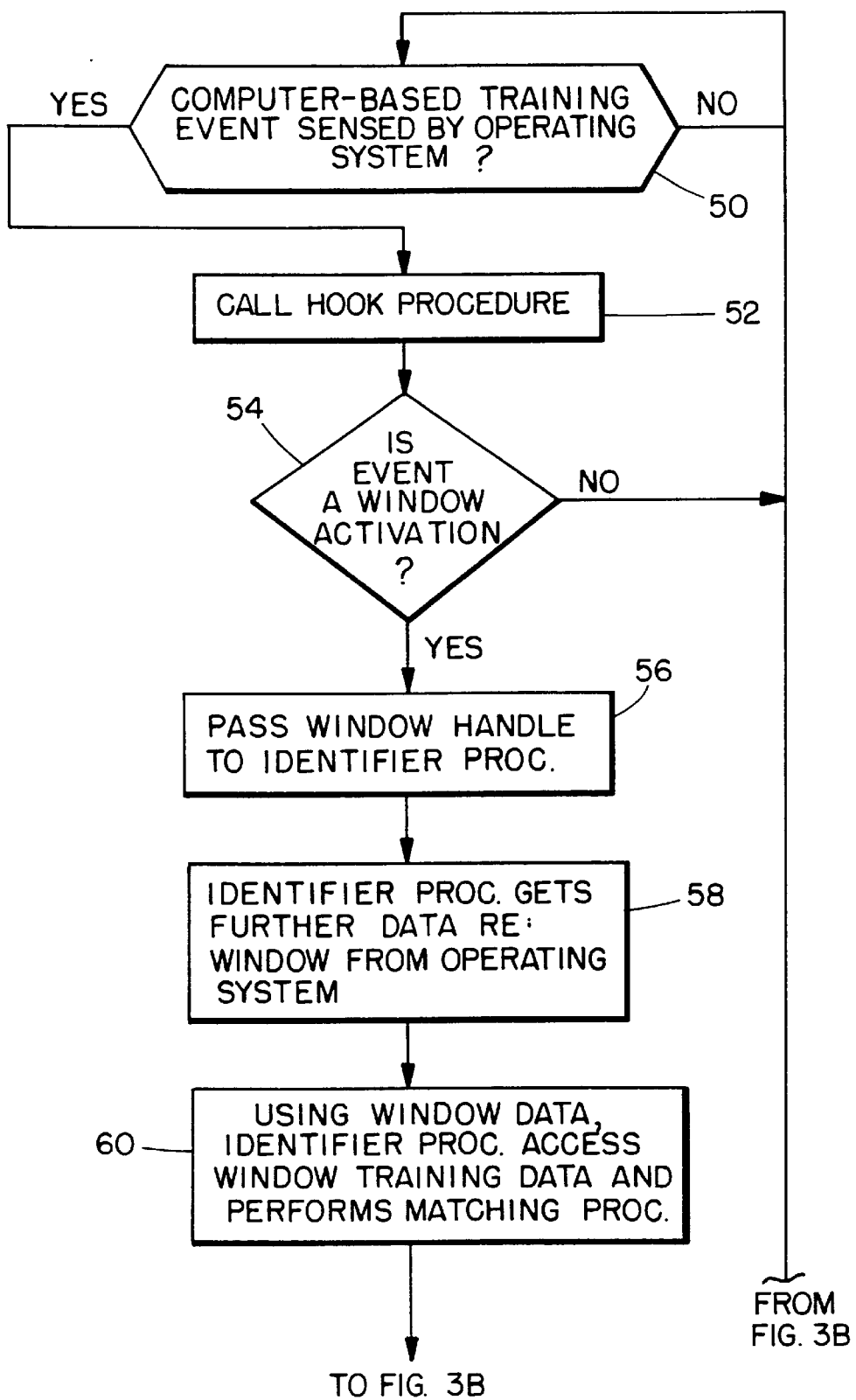

Turning to the logic flow diagrams of FIGS. 3A and 3B, a description of the method of the invention will be provided. As indicated above, it is assumed that operating system 22 is the Windows Operating System which includes a plurality of hook procedures that are available to the application programmer. One of those procedures is the WH_CBT hook (computer based training) which provides a call signal to a designated address upon an occurrence of one of ten different types of events. One of those events activation of a dialog box by an application.

Accordingly (as shown in decision box 50), the procedure of the invention awaits a call from the Windows Operating System indicating that an event has been sensed in accordance with the WH_CBT hook. Such an event's occurrence results in a call being issued to hook procedure 26 (box 52) which further determines whether the event is a newly activated dialog box (decision box 54). If not, the procedure recycles back to decision box 50 to await the next call. Otherwise, it is concluded that a newly activated window has been activated, and hook procedure 26 calls identifier procedure 28 (box 56) and passes thereto the handle of the newly activated dialog box.

Because each time a newly activated dialog box is created by the operating system, a newly activated handle can be assigned—even though the dialog box is identical to a previous dialog box, the handle, per se, of a dialog box is an insufficient identifier upon which to base activation of the expedited log-on procedure. Accordingly, upon receiving the newly activated dialog box handle, identifier procedure 28 causes the operating system to obtain further data from the application regarding the newly activated dialog box, including the class of the newly activated dialog box (box 58). Thereafter identifier procedure 28 utilizes the newly activated dialog box data to identify the precise application (and version) from which the dialog box was created (to assure correct identification of the dialog box).

To accomplish the above indicated application identification, identifier procedure (box 60) utilizes the newly activated dialog box data to access the parent window title (and parent window class) thereof. This procedure is reiterated until a top window box is determined. The top window is recognized as "top" as it has no parent. Thereafter, identifier procedure 28 utilizes the acquired newly activated dialog box data and parent window data (if any) to perform a search of training data 32 in registry 30 to find a match. The comparison action is performed by attempting to match data retrieved through use of the title of the newly activated dialog box, its class, the parent window title, parent window class, the top window class, etc. to training data 32. If a match is found, the matching dialog box data allows identification of a specific application which includes the newly activated dialog box. However, to assure that the version of the matching application is the one which actually created the newly activated dialog box, additional matching is performed.

Version identification is accomplished by assuring that child window(s) and button(s) present in the newly activated dialog box match the child window(s) and button(s) specified by training data 32 as included in the application dialog box that has been discovered to "match". If the child window/button matching action fails, a further version's dialog box is accessed and the matching action is again attempted. If there is no match found (decision box 62), the procedure recycles back to decision box 50 to await the next event output. If, by contrast, a match is found, identifier procedure 28 returns control to hook procedure 26 which, in turn, makes a call to time-out procedure 34 which initiates a time-out action and returns control of the system to operating system 22 to enable further processing of other applications (box 64).

At the end of the time-out, hook procedure 26 issues a call to identifier procedure 28 which, in turn, passes the dialog box identification data to Lockbox 36 which holds entry text 38 that is to be inserted into the identified dialog box (box 66). Lockbox 36 then accesses the entry text and emulates a typing action, thereby causing entry of the text into the dialog box. Lockbox 36 further executes button pushes to indicate completion of entry of the text strings, so as to allow further execution of the associated application.

As can be seen from the above, the method of the invention enables not only automatic entry of credential data into a dialog box, but further enables precise identification of the application which creates the dialog box (even if there are multiple versions of the application which is currently in process). Thus, the automatic expedited log-on procedure is adapted to operate with a multiplicity of applications that implement dialog boxes, without requiring user intervention.

The method of the invention can also manipulate windows as a single entity. For example, it is possible to enter the appropriate data in all property sheets (a group of tabbed dialogue boxes) in a control panel if any one of the windows (property sheets) is activated. This requires additional data to describe their relationship, additional data that defines how to activate each window (similar to typing a keyboard accelerator), and code that prevents an infinite loop due to the program activating the other windows in order to enter text therein.

Most windows applications use a graphical user interface (GUI). The method of the invention can also be used with console applications such as ftp or telnet, since Windows supports hook procedures for console applications. Different API calls may be needed to read/parse lines of text in the console window (the activated window) in order to react to prompts such as "Username:", or to emulate the user typing.

Hereafter, a detailed step-by-step sequence of the invention will be presented, preceded by a description of the data stored in Lockbox 36. However, as the detailed sequence uses many Windows-oriented terms, a glossary is presented first.

Glossary active window: a top-level window of an application with which the user is working. Windows identifies the active window by positioning it at the top of the Z order and highlighting its title bar and border BSTR: a far pointer to a UNICODE (16 bit data) NULL terminated string with a four byte (DWORD) length prefix used by COM. It can contain embedded NULL's.

button: buttons are a type of control typically used in windows. For example, a user typically presses an <OK> and <Cancel> button to continue or abort. Windows provides five kinds of buttons: push buttons, check boxes, radio buttons, group boxes, and owner-drawn buttons. Each type has one or more styles.

callback: a far address of a function that another application or the operating system will call. It implies that the address was somehow registered or passed to the caller. For example, when the WIN32 function "SetTimer" is called to create a timer with a specified timeout value, it is passed the address of the function (TIMERPROC) which should call to notify when the time out value expires. Similarly when a hook is set using the W1N32 function "SetWindowsHookEx", it is passed the address of the function (HOOKPROC) to enable the operating system to call that an event has occurred.

child window: a window that has the WS_CHILD style. A child window always appears within the client area of its parent window.

class name: an application must register a window class before it can create a window of that class. Registering a window class associates a window procedure, class styles, and other class attributes with a class name. When an application specifies a class name in the CreateWindow or CreateWindowEx function, the operating system creates a window with the window procedure, styles, and other attributes associated with that class name.

Component Object Model (COM): this is a intra/inter process communication method to call the interface of a component. Interfaces are identified with GUID's (i.e., unique numbers) which are normally stored in the registry.

console process: a character-mode process whose entry point is the main function. A console process uses the console functions or the file input and output (I/O) functions for I/O, while a graphical user interface (GUI) process uses the USER/graphic device interface (GDI) functions. A console process is a Windows program that does not use a GUI.

control: a child window used in conjunction with another window to carry out simple input and output (I/O) tasks. For example, an edit control is used to enter/edit text.

control identifier: a number that an application uses to uniquely identify a control.

credential: depending upon the context, this is either just access information such as a user name/password, or it refers to all of the text that the Lockbox enters for the user.

credential manager DLL: the NT specific version of a network provider.

default window procedure: a system-defined function that provides default processing for messages an application-defined window procedure does not process.

desktop window: a system-defined window that paints the background of the screen and serves as the base for all windows displayed by all Windows applications.

dialog box: a window displayed in the user interface (UI) to solicit input from the user. It contains one or more controls.

dynamic-link library (DLL): a DLL file that contains one or more functions compiled, linked, and stored separately from the processes that use them. The operating system maps DLLs into the process's address space when the process is starting up or while it is running. The process then executes functions in the DlL.

edit control: an element of the Windows user interface that allows the user to enter and edit text. Edit controls are typically used in dialog boxes.

exe: an executable program.

graphical user interface (GUI) process: a process whose entry point is the WinMain function. A GUI process uses the USER/graphics device interface (GDI) functions for input and output (I/O), while a console process uses the console functions or the file I/O functions.

hook: a point in the Windows message-handling mechanism where an application can install a subroutine to monitor messages. It can also be used to block events from occurring.

hook chain: a list of pointers to the hook procedures associated with a hook. When a message occurs that is monitored by the hook, Windows calls the first hook procedure in the chain.

hook procedure (HOOKPROC): an application-defined callback function whose address has been installed in a hook chain.

main window: the window that serves as the primary interface between the user and an application.

message: a data packet used for communicating information or a request. Messages can be passed between the operating system and an application, different applications, threads within an application, and windows within an application.

log-on window: an informal name for a dialog box with a username and password edit control, that is used to authenticate a user.

parent window: a window that has one or more child windows.

registry: the database in which configuration information is registered. This database takes the place of most configuration and initialization files for Windows and newly activated Windows-based applications.

window class: every window is a member of a window class. A window class is a set of attributes that Windows uses as a template to create a window in an application. Each window class has an associated window procedure shared by all windows of the same class. The windows procedure processes messages for all windows of that class and therefore controls their behavior and appearance.

window title: a 32-bit value, assigned by Windows that uniquely identifies a window. This value can change the next time the window is created.

window name: a text string that identifies a window for the user.

Windows password: Windows NT normally requires the user to log-on to the system when it boots, entering a username and a password. The same type of dialog box is displayed under Windows 95 under certain conditions. In either case, the term refers to the first password the user enters when logging onto the system.

Lockbox Instance

The Lockbox stores credentials in the following format. There can be more than one set of instance data per application.

short Version—a version number
BSTR Application name—the name of the application
BSTR Instance—a tag that uniquely identifies each set of instance data.
BSTR Description—a user set-able descriptive string for the expedited log-on control panel.
DWORD Count—number of tag/credential pairs. followed by "Count" copies of:
BSTR Tag—identifies the value.
BSTR Value—the string that should be entered in the edit field.

Step-by-Step Procedure

The operating system runs load.exe, because it is part of the startup group.

Load.exe uses WIN32 calls "LoadLibrary" and "GetProcAddress" to load the hook DLL, and call its SetHook function.

SetHook makes a WIN32 "SetWindowsHookEx" call to register HookProc as a callback function for a system wide computer based training hook (WH_CBT). If successful, it stores the hook title in a shared data segment for later use by HookProc. If unsuccessful, the sequence ends.

Nothing happens until the operating system calls the HookProc callback to notify it of an upcoming event. A side effect is that the operating system injects hook DLL into the appropriate process.

HookProc examines the event code (which of the ten possible event types is it?).

If the event code is not HCBT_ACTIVATE (i.e., window about to be activated), HookProc returns control to the system (and allows the event to occur) by calling the WIN32 API "CallNextHookEx". It passes on (unchanged) the arguments the operating system passed to it. An exception handler (that does nothing other than catch all exceptions thrown by other applications and not handled) is provided just before the CallNextHookEx call.

If the event code indicates the a window is about to be activated, it calls the COM functions CoInitialize and CoCreateInstance to load the Identifier, and get a far function pointer to its functions. (Note: these calls need to be made every time in HookProc since the function pointers would become invalid if they were made in SetHook, and stored them in a shared data segment so that each copy of Hook.DLL could access them).

One side effect of the CoCreateInstance call is that DLLGetClassObject (a standard COM function) in Identifier is called. This is used as a chance to check a flag whether the Identifier has been initialized. Since this is the first call, it isn't initialized. It will call the network provider/credential manager to get the username the user logged on with, and use it to locate the user's training data in the registry. This will be stored in the HKEY_CURRENT_USER hive, under a key based on the username. The Identifier will then make registry calls to find and load all of the user's training data, and store it in memory. It will also make a CoCreateInstance call to load the Lockbox and get a far function pointer to its interface. This far function pointer is stored in the shared data segment.

One side effect of the second CocreateInstance call is that DLLGetClassObject (a standard COM function) in Lockbox is called. This is used as a chance to check a flag whether the Lockbox has been initialized. Since this is the first call, it isn't initialized. It will call the network provider/credential manager to get the username and password that the user logged on with, and use it to locate and decrypt the user's credentials (instance data) stored in the registry. This will be stored in the HKEY_CURRENT_USER hive, under a key based on the username. It will then make a VirtualAlloc call with a flag set to prevent the memory from ever being swapped to the disk, and store the credentials in it.

HookProc calls FindApp in "Identifier", passing it the newly activated window title.

FindApp makes several WIN32 API calls to get more info about the newly activated window, and then searches the training data to see if it can identify it. It does this as follows:

Call GetClassName to get the newly activated window's classname.
Call GetParent to get the parent window.
Call GetClassName to get the classname of the parent window.

Start with the first set of stored training data.

Compare the window classname with the window classname in the training data.

If they are not identical, restart the search with the next set of training data.

Compare the parent window classname with the parent window classname in the training data.

If they are not identical, restart the search with the next set of training data.

Make repeated calls to GetParent to find the top window (highest level in the hierarchy) and then call GetClassName to get its class name.

Compare the top window's classname with the top window classname in the training data.

If they are not identical, restart the search with the next set of training data.

If they are identical, it is very likely that the right application has been found, so now time can be invested to check its child windows (next step). The main risk is that it is a different window (with no parent window) in the identified application, or a different version of the identified application.

Continue until all of the training data has been checked. if it never finds a match return failure.

If FindApp hasn't returned failure, it checks the child windows as follows:

Enumerate all of the child windows using EnumChildWindows. This calls a callback function for each child window that builds a list of the titles, control id's, classname, and parents' control id's for all of the child windows.

FindApp then searches through this list to verify that it can find the corresponding control id, classname, and parent control id for the buttons and edit fields identified in the training data. It then makes WIN32 GetWindowTxt calls to get the caption for each button, and compares them against the training data. It doesn't care that other child windows exist—just that the ones it expects to find are really there. If any of the comparisons fail, it restarts the search with the next set of training data. Otherwise it stores the window titles that the Lockbox will need in a shared data segment and returns the application's name, and that it succeeded, If the FindApp call succeeded, HookProc stores the window's title and the application's name in an array in the shared data segment, and makes a call to SetTimer to have the operating system call TimerProc in ⅒th of a second. This gives a chance for the application to finish initializing the edit fields in the window before their values are entered HookProc calls CallNextHookEx, passing the hook's title (from the shared data segment) and the event code, window title, and LPARAM value passed to HookProc when the operating system called it. An exception handler (that does nothing other than catch all exceptions thrown by other applications and not handled) is provided just before the CallNextHookEx call. Control is passed to the operating system and nothing happens until the operating system calls HookProc for another iteration unless the timer is set (due to FindApp succeeding).

The operating system calls TimerProc in the "Hook", passing it a TimerId, which is really the window title.

TimerProc searches the array in the shared data segment for the matching window title, to retrieve the application's name.

TimerProc kills the timer.

TimerProc calls CoInitialize and CoCreateInstance to load Identifier and get a far function pointer to its functions.

TimerProc calls DelegateIt in Identifier, passing it the window title and the name of the application.

DelegateIt searches for the corresponding training data, based on the application name.

DelegateIt retrieves the window title and the training data for the controls (edit fields and buttons) and passes it, the window title, and the application's name to the SendData function in the Lockbox. This provides the Lockbox with the information it needs to know where/how to emulate typing the credentials and where/how to press the appropriate buttons. However, it doesn't know what text to enter yet.

SendData uses the application's name to search its stored data for the appropriate instance data. If there is more than one set of instance data for that application, it pops up a list box listing the descriptive strings (stored with the credentials in the instance data) and asks the user to choose one.

In either case, it has identified what instance data to use (i.e. what credentials) and can make the appropriate WIN32 SendMessage calls to enter the text or press the buttons.

Control is returned to the system. The sequence repeats the next time the operating system calls HookProc to report an upcoming event.

System Training

The method of the invention incorporates a training procedure for generating and storing data used to recognize a window, and to describe what buttons should be pressed. The training procedure leads the user through a step by step process where it asks the user to enter data in an edit control and then right-click on a window. It then displays visible characteristics such as captions and the text entered in the edit control that the user can see to verify that it identifies the right window. The procedure repeats as necessary to identify the next window (or to try again to identify a current window).

The training procedure enables storage of data locally in the Windows registry, or remotely. If it stores the data remotely it also needs to address administrative issues such as for who/how is the data shared, and are the credentials obtained from a backing store (i.e., a security domain) or just stored as is. The advantage of the training procedure is that it automates creating the training data, without requiring any technical knowledge on the part of the user.

The basic steps employed during training are as follows:

1. User launches an application and does whatever is necessary to bring up a dialogue box/window.
2. User launches the training procedure. The procedure installs a hook procedure to capture all keyboard and mouse inputs.
3. User navigates as necessary to activate the dialogue box/window. Unique text is entered in one of its edit controls, and the right click on the window that is to be identified. (Window navigation is normally limited to using the left mouse button and the keyboard).
4. The training procedure detects the right click, and makes WIN32 calls to get information about the window, its child and parent window, the contents of the edit controls, and to identify the application.

6. The training procedure displays non-technical visible information about the dialogue box it thinks the user identified—its caption/title, captions/labels for edit controls, button labels, contents of any edit controls, and the name of the application.

7. If the user confirms the window identification, proceed to the next step. Otherwise, the training procedure makes WIN32 calls to get information about other possible candidates, and displays a summary. The user chooses one, and resumes with step 6.

8. The training procedure stores the appropriate training data for the identified window. It prompts the user as necessary to repeat steps 3–8 for each edit control as necessary.

9. The training procedure goes through a similar process (no text entered) to identify each button. Buttons are identified in the order they should be pushed.

10. The training procedure saves the training data, and de-installs the hook procedures.

The preceding sequence is used for training desktop applications. If a command is added to logoff a network provider, the sequence can also be used to train for the provision of credentials during a workstation log-on sequence, before the desktop is up. It is also possible to use the training procedure to identify multiple windows, so that they can be manipulated as a single entity.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for controlling a computer to automatically act upon information present in a window, said computer including a database which stores instances of data that define characteristics of plural windows which accept entered data, said method comprising the steps of:
   a) monitoring programs executing on said computer and signalling occurrence of at least one event of a set of events, one of said set of events being a new activation of a window;
   b) in response to said signalling, determining if (i) said one event is a newly activated window and (ii) an identifier for said newly activated window;
   c) determining if descriptive data regarding said newly activated window matches an instance of window data in said database; and, if yes
   d) accessing an instance of said information and, under control of data from said instance of window data in said database, entering said instance of said information into said newly activated window to allow further processing to continue.

2. The method as recited in claim 1, wherein said computer operates under the Windows® operating system and step a) uses a system-wide computer-based hook to detect said occurrence of at least one event of said set of events.

3. The method as recited in claim 1, wherein said window is a dialog box, said instance of information is user credential data and said computer is dependent upon properly configured credential data to enable a user to access one or more applications.

4. The method as recited in claim 3, wherein step c) compares said descriptive data regarding said newly activated dialog box to at least some of the following data to determine a match: class name of the instance of the dialog box, a parent window and any top window associated therewith; child windows in the dialog box data and edit fields and/or buttons therein; edit field class name; and button field class names.

5. The method as recited in claim 3, wherein step d) interposes a time delay between said accessing and entering of said user credential data to assure sufficient time is provided for said computer to initialize the dialog box.

6. The method as recited in claim 5, wherein step d), during said time delay between said accessing and said entering of said user credential data, returns control to another process in said computer to allow said another process to operate during said time delay.

7. The method as recited in claim 1, wherein if step c) determines that said descriptive data regarding said newly activated window matches plural instances of window data in said database, a message is presented to a user to make a selection of one of said plural instances, said selection being thereafter used in step c).

8. The method as recited in claim 1, wherein step a) is preceded by the following:
   training said computer by inputting instances of window data which enable identification of associated windows.

9. A memory media for controlling a computer to automatically act upon information present in a window, said computer including a database which stores instances of data that define characteristics of plural windows which accept entered data, said memory media comprising:
   a) means for controlling said computer to monitor programs executing on said computer and to signal occurrence of at least one event of a set of events, one of said set of events being a new activation of a window;
   b) means for controlling said computer to respond to said signalling by determining if (i) said one event is a newly activated window and (ii) an identifier for said newly activated window;
   c) means for controlling said computer to determine if descriptive data regarding said newly activated window matches an instance of window data in said database; and, if yes
   d) means for controlling said computer to access an instance of said information and, under control of data from said instance of window data in said database, to enter said instance of said information into said newly activated window to allow further processing to continue.

10. The memory media as recited in claim 9, wherein said computer operates under the Windows® operating system and means a) uses a system-wide computer-based hook to detect said occurrence of at least one event of said set of events.

11. The memory media as recited in claim 9, wherein said window is a dialog box, said instance of information is user credential data and said computer is dependent upon properly configured credential data to enable a user to access one or more applications.

12. The memory media as recited in claim 11, wherein means c) causes said computer to compare said descriptive data regarding said newly activated dialog box to at least some of the following data to determine a match: class name of the instance of the dialog box, a parent window and any top window associated therewith; child windows in the dialog box data and edit fields and/or buttons therein; edit field class name; and button field class names.

13. The method as recited in claim 11, wherein means d) causes said computer to interpose a time delay between said accessing and entering of said user credential data to assure sufficient time is provided to enable initialization of the dialog box.

14. The memory media as recited in claim 13, wherein means d), during said time delay between said accessing and said entering of said user credential data, causes said computer to return control to another process to allow said another process to execute during said time delay.

15. The memory media as recited in claim 9, wherein if means c) causes said computer to determine that said descriptive data regarding said newly activated window matches plural instances of window data in said database, said computer is further causes to issue a message to a user to make a selection of one of said plural instances, said selection being thereafter used by means c).

16. The memory media as recited in claim 9, further comprising: means for training said computer which enables an inputting and storage by a user of instances of window data which enable identification of associated windows.

* * * * *